(12) United States Patent
Ma

(10) Patent No.: US 11,543,894 B2
(45) Date of Patent: Jan. 3, 2023

(54) DISPLAY APPARATUS

(71) Applicants: BEIJING BOE TECHNOLOGY DEVELOPMENT CO., LTD., Beijing (CN); BOE TECHNOLOGY GROUP CO., LTD., Beijing (CN)

(72) Inventor: Yongda Ma, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 198 days.

(21) Appl. No.: 17/255,183

(22) PCT Filed: Jun. 24, 2020

(86) PCT No.: PCT/CN2020/098260
§ 371 (c)(1),
(2) Date: Dec. 22, 2020

(87) PCT Pub. No.: WO2020/259627
PCT Pub. Date: Dec. 30, 2020

(65) Prior Publication Data
US 2021/0200327 A1 Jul. 1, 2021

(30) Foreign Application Priority Data

Jun. 28, 2019 (CN) .......................... 201910575019.1

(51) Int. Cl.
*G06F 3/02* (2006.01)
*G06F 1/16* (2006.01)
*G06F 3/046* (2006.01)

(52) U.S. Cl.
CPC .......... *G06F 3/0227* (2013.01); *G06F 1/1658* (2013.01); *G06F 3/046* (2013.01)

(58) Field of Classification Search
CPC ....... G06F 3/0227; G06F 1/1658; G06F 3/046
See application file for complete search history.

(56) References Cited

U.S. PATENT DOCUMENTS

2016/0254497 A1* 9/2016 Han ..................... H01L 21/0231
250/453.11
2018/0060641 A1* 3/2018 Kim ................... G06V 40/1324

FOREIGN PATENT DOCUMENTS

| CN | 107655857 A | 2/2018 |
|---|---|---|
| CN | 108390966 A | 8/2018 |

(Continued)

OTHER PUBLICATIONS

PCT/CN2020/098260, International Search Report (w/ English translation) for corresponding PCT Application No. PCT/CN2020/098260, dated Sep. 29, 2020, 5 pages.

(Continued)

*Primary Examiner* — Abbas I Abdulselam
(74) *Attorney, Agent, or Firm* — Dority & Manning, P.A.

(57) ABSTRACT

A display apparatus includes: a display panel; a housing configured to support and protect the display panel; a support, the support being arranged between the display panel and the housing; a plurality of sensors, the plurality of sensors being fixed on the support; a window, the window being located in the display panel or the housing and being configured to expose at least one sensor; and a driver, the driver being configured to control the support to move along a plane parallel to the display panel, and to control the support to stop moving when a required sensor moves to a position of the window.

18 Claims, 6 Drawing Sheets

(56) References Cited

FOREIGN PATENT DOCUMENTS

| | | |
|---|---|---|
| CN | 208092591 U | 11/2018 |
| CN | 208094612 U | 11/2018 |
| CN | 208128325 U | 11/2018 |
| CN | 109379468 A | 2/2019 |
| CN | 109442185 A | 3/2019 |
| CN | 109561179 A | 4/2019 |
| CN | 109831560 A | 5/2019 |
| CN | 209012746 U | 6/2019 |
| CN | 110287909 A | 9/2019 |
| JP | 2018074295 A | 5/2018 |
| KR | 20190027495 A | 3/2019 |

OTHER PUBLICATIONS

Chinese First Office Action (w/ English translation) for corresponding CN Application No. 201910575019.1, 20 pages.
Chinese Second Office Action (w/ English translation) for corresponding CN Application No. 201910575019.1, 12 pages.

* cited by examiner

DISPLAY APPARATUS

CROSS-REFERENCE TO RELATED APPLICATIONS

This application is a national phase entry under 35 USC 371 of International Patent Application No. PCT/CN2020/098260 filed on Jun. 24, 2020, which claims priority to Chinese Patent Application No. 201910575019.1, filed with the Chinese Patent Office on Jun. 28, 2019, which are incorporated herein by reference in their entirety.

TECHNICAL FIELD

The present disclosure relates to the field of display technologies, and in particular, to a display apparatus.

BACKGROUND

With the development of display technology, consumers have higher and higher requirements for display apparatuses, and the market orientation is gradually developing towards full-screen display and double-sided screen display.

SUMMARY

A display apparatus is provided. The display apparatus includes: a display panel; a housing configured to support and protect the display panel; a support, the support being arranged between the display panel and the housing; a plurality of sensors, the plurality of sensors being fixed on the support; a window, the window being located in the display panel or the housing and being configured to expose at least one sensor of the plurality of sensors; and a driver, the driver being configured to control the support to move along a plane parallel to the display panel, and to control the support to stop moving when a sensor required by the user moves to a position of the window.

In some embodiments, the driver includes a first electromagnetic switch, a second electromagnetic switch, a first electromagnet and a second electromagnet. The first electromagnet and the second electromagnet are respectively arranged at two opposite sides of the support. The first electromagnetic switch is configured to control the support to move in a direction from the first electromagnet to the second electromagnet or a direction from the second electromagnet to the first electromagnet in response to a user's instruction. The second electromagnetic switch is configured to control the support to move in the direction from the first electromagnet to the second electromagnet or the direction from the second electromagnet to the first electromagnet in response to a user's instruction.

In some embodiments, the support is made of a magnetic material or a permanent magnet.

In some embodiments, in a case where the support is made of a magnetic material, the first electromagnetic switch and the second electromagnetic switch are configured not to be simultaneously turned on.

In a case where the support is made of a permanent magnet, the first electromagnetic switch and the second electromagnetic switch are configured to be simultaneously turned on or not to be simultaneously turned on.

In some embodiments, the driver includes an adjusting rod, and the housing includes an opening. One end of the adjusting rod is connected to the support, and another end of the adjusting rod protrudes from the housing through the opening.

In some embodiments, the display apparatus further includes a limiting structure, and the limiting structure is disposed between the housing and the support. The limiting structure is configured to make the support stop moving when the sensor required by the user moves to the position of the window.

In some embodiments, the support includes at least one limiting groove, and the at least one limiting groove is configured to cooperate with the limiting structure to make the support stop moving when the sensor required by the user moves to the position of the window.

In some embodiments, the support further includes at least one buffer groove. The at least one buffer groove and the at least one limiting groove meet at least one of the following conditions: a depth of the at least one buffer groove is less than a depth of the at least one limiting groove; an attractive force of the at least one buffer groove direct facing the limiting structure on the limiting structure is less than an attractive force of the at least one limiting groove direct facing the limiting structure on the limiting structure; or a surface friction force of the at least one buffer groove is less than a surface friction force of the at least one limiting groove.

In some embodiments, the limiting structure includes at least one protrusion arranged on the housing.

In some embodiments, a height of the limiting structure is adjustable along a depth direction of the at least one limiting groove. When the support moves, an end of the limiting structure proximate to the support is retracted to be flush with a top surface of the at least one limiting groove, and when the support stops moving, the end of the limiting structure proximate to the support extends into the at least one limiting groove.

In some embodiments, the display panel includes a first display panel and a second display panel. A surface of the first display panel facing away from the second display pan& is a display surface, a surface of the second display panel facing away from the first display panel is a display surface, and the window is arranged in the first display panel or in the second display panel. The housing includes a frame, and the frame supports and protects the first display panel and the second display panel.

In some embodiments, the display apparatus further includes a supporting structure, and the supporting structure is supported between the first display panel and the second display panel.

In some embodiments, the housing includes a frame and a rear shell. The rear shell is disposed opposite to the display panel, and the window is disposed in the rear shell.

In some embodiments, the display apparatus further includes a supporting structure, and the supporting structure is supported between the display panel and the rear shell.

In some embodiments, the display panel includes a display area and a non-display area located at at least one side of the display area, and the window is disposed in the display area, or the window is disposed in the non-display area.

In some embodiments, the window includes a notch formed by removing material from the display panel. Or, the window includes a notch formed by removing material from the display panel, and a transparent or a semi-transparent protective layer covering the notch.

In some embodiments, the plurality of sensors include at least two of a camera, a fingerprint sensor, an optical sign recognition sensor, a distance sensor, a proximity light-sensor or an ambient light sensor.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, but are not limitations on an actual size of a product, an actual process of a method and an actual timing of a signal involved in the embodiments of the present disclosure.

DETAILED DESCRIPTION

Figure 1:
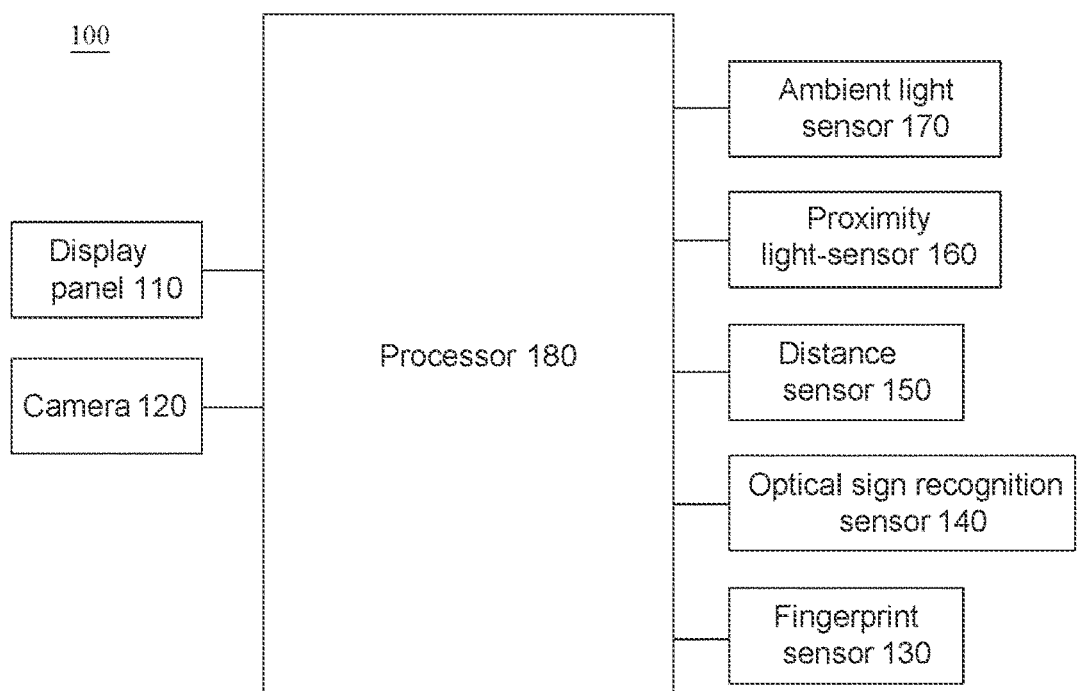
FIG. 1 is a structural diagram of hardware of a display apparatus, according to some embodiments of the present disclosure.

Technical solutions in some embodiments of the present disclosure will be described dearly and completely below with reference to the accompanying drawings. However, the described embodiments are merely some but not all embodiments of the present disclosure. All other embodiments obtained by a person of ordinary skill in the art on the basis of the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to".

In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment or example. In addition, the specific features, structures, materials or characteristics may be included in any one or more embodiments or examples in any suitable manner.

Hereinafter, terms such as "first" and "second" are used for descriptive purposes only, and are not to be construed as indicating or implying the relative importance or implicitly indicating the number of indicated technical features below. Thus, features defined as "first" and "second" may explicitly or implicitly include one or more of the features. In the description of the embodiments of the present disclosure, the term "a plurality of/the plurality of" means two or more unless otherwise specified.

In the description of embodiments of the present disclosure, it will be understood that orientations or positional relationships indicated by terms "center", "upper", "lower", "front", "rear", "left", "right", "vertical", "horizontal", "top", "bottom", "inner", "outer", etc, are based on orientations or positional relationships shown in the drawings, merely to facilitate and simplify the description of the present disclosure, but not to indicate or imply that the referred devices or elements must have a particular orientation, or must be constructed or operated in a particular orientation. Therefore, they should not be construed as limitations to the present disclosure.

At present, display apparatuses generally have other functions in addition to a display function of displaying images and videos. For example, display apparatuses can monitor a user's vital signs including heartbeat, blood pressure, breathing, etc.; display apparatuses can monitor the user's walking steps or riding distance; display apparatuses can perceive changes in a brightness of ambient light, so as to adjust a brightness of its own screen to adapt to the brightness of the ambient light to avoid damage to the user's eyesight; display apparatuses can collect the user's fingerprints to realize identity verification of the user; display apparatuses can measure a distance, such as a depth of a house; display apparatuses can also determine whether there are objects nearby, so as to remind blind users or remind users to avoid bumps in the dark at night.

Some embodiments of the present disclosure provide a display apparatus. The display apparatus includes a display panel, a plurality of sensors, and a processor, and the plurality of sensors can implement the aforementioned functions. The plurality of sensors include at least two sensors. For example, the display apparatus may be a handheld display apparatus such as a mobile phone, a tablet computer, a wearable apparatus, a personal digital assistant, etc.; it may also be a display apparatus that does not need to be hand-held, such as a notebook computer, a desktop computer, a television, or a digital photo frame.

FIG. 1 is a schematic diagram showing a structure of the display apparatus 100. The display apparatus 100 includes a display panel 110, a camera 120, a fingerprint sensor 130, an optical sign recognition sensor 140, a distance sensor 150, a proximity light-sensor 160, an ambient light sensor 170, and a processor 180.

It will be understood that the structure shown in FIG. 1 does not constitute a limitation on the display apparatus 100. In some embodiments of the present disclosure, the display apparatus 100 may include more or less components than those shown in FIG. 1, or may combine certain components or disassemble certain components.

The display panel 110 is used for displaying images, videos, etc., and the display panel 110 may be a liquid crystal display (LCD) panel, an organic light-emitting diode (OLED) display panel, an active-matrix organic light-emitting diode (AMOLED) display panel, a flexible light-emitting diode (FLED) display panel, a quantum dot light-emitting diode (QLED) display panel, etc. In some embodiments, the display panel 110 may also be a double-sided display panel that includes two display panels, such as a combination of a color display panel and an electronic paper display panel. The color display panel may be any of the aforementioned display panels. Or, the two display panels in the double-sided display panel are both color display panels, and the color display panel may be any of the aforementioned display panels.

The camera 120 is used for capturing still images or shoot videos. For an object, an optical image thereof is generated through a lens in the camera 120, and the optical image is projected to a photosensitive element. The photosensitive element may be a charge-coupled device (CCD) or a complementary metal oxide semiconductor (CMOS) phototransistor. The photosensitive element converts light signals into electrical signals, and then transmits the electrical signals to an image signal processor (ISP) to convert them into digital image signals. The ISP outputs the digital image signals to a digital signal processor (DSP) for processing, and the DSP converts the digital image signals into image signals of standard RGB, YUV or other formats. The camera may be an RGB camera, an infrared camera, a depth camera, etc.

The fingerprint sensor 130 is used for collecting fingerprints, and the display apparatus uses the collected fingerprint features to realize such functions as using fingerprints to unlock a phone, access application locks, and take photos. The fingerprint sensor 130 may be an optical fingerprint sensor, a capacitive fingerprint sensor, an ultrasonic fingerprint sensor, or the like.

The optical sign recognition sensor 140 is used for monitoring the user's vital signs, including heartbeat, blood pressure, breathing, etc. It can also be used for monitoring the user's walking steps or riding distance.

The distance sensor 150 is used for measuring a distance, for example, to measure the depth of a house. The distance sensor 150 can measure the distance by infrared or laser.

The proximity light-sensor 160 may include, for example, a light emitting diode (LED) and a photodetector such as a photodiode. The light emitting diode may be an infrared light emitting diode. The display apparatus emits infrared light through the LEDs, and uses photodiodes to detect infrared reflected light from nearby objects. When sufficient reflected light is detected, it can be determined that there an object near the display apparatus. When insufficient reflected light is detected, the display apparatus can determine that there is no object nearby.

The ambient light sensor 170 is used for perceiving the brightness of the ambient light. The display apparatus can adaptively adjust a brightness of the display panel according to the perceived brightness of the ambient light, so as to avoid harming the eyesight of the user. The ambient light sensor can also be used to automatically adjust the white balance when taking pictures.

The processor 180 may include one or more processing units. For example, the processor may include a controller, a memory, a graphics processing unit (GPU), an ISP, a video codec and a DSP. The memory may include a random access memory (RAM), a flash memory, a read-only memory (ROM), an erasable programmable read-only memory (EPROM), an electrically erasable programmable read-only memory (EEPROM), and a register.

The aforementioned camera 120, fingerprint sensor 130, optical sign recognition sensor 140, distance sensor 150, proximity light-sensor 160 and ambient light sensor 170 need to be in direct contact with the user's finger or not be blocked by other objects when implementing their corresponding functions. This requires that more or larger windows be arranged in the display panel to expose these sensors.

However, in the current development trend of display apparatuses, full-screen display is becoming more and more popular, which requires that an area of a display area of the display panel becomes increasingly larger and an area of a non-display area becomes increasingly smaller. The aforementioned plurality of sensors are generally arranged in the non-display area.

Figure 2A:
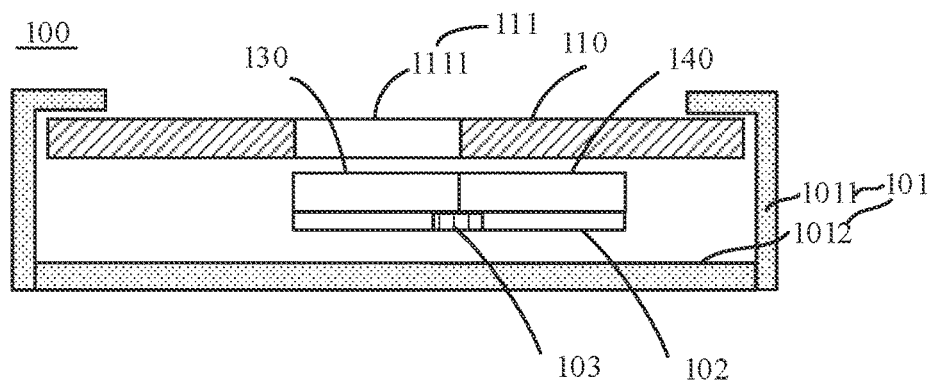
FIG. 2A is a cross-sectional view of a display apparatus, according to some embodiments of the present disclosure.
Figure 2B:
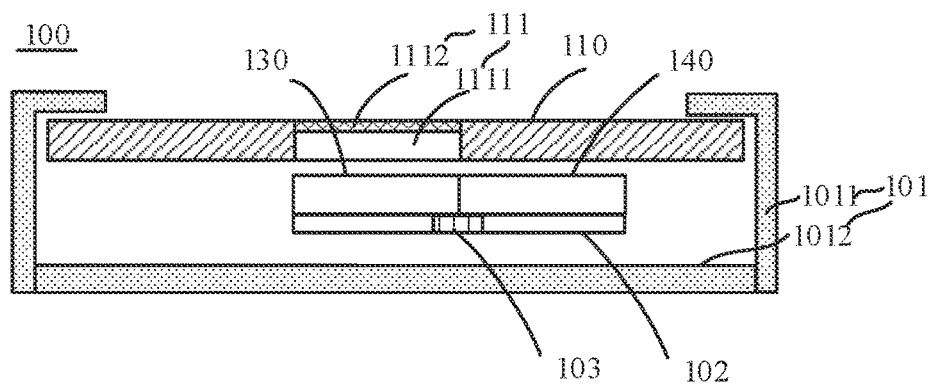
FIG. 2B is a cross-sectional view of another display apparatus, according to some embodiments of the present disclosure.

On this basis, as shown in FIG. 2A and FIG. 2B, the display apparatus 100 of some embodiments of the present disclosure further includes a housing 101. The display panel 110 is located in the housing 101, and the housing 101 supports and protects the display panel 110. The display apparatus 100 further includes a support 102, which is located between the housing 101 and the display panel 110 and is configured to fix and support the aforementioned plurality of sensors. In some embodiments of the present disclosure, the aforementioned plurality of sensors include at least two of a camera 120, a fingerprint sensor 130, an optical sign recognition sensor 140, a distance sensor 150, a proximity light-sensor 160 or an ambient light sensor 170, etc. As an example, FIG. 2A and FIG. 2B only show the fingerprint sensor 130 and the optical sign recognition sensor 140.

The display panel 110 includes a window 111, a size of which is smaller than a size required to expose the plurality of sensors. For example, the size of the window 111 can only expose one sensor. For another example, when the number of the plurality of sensors is two or more, the size of the window 111 can only expose one or two sensors. For yet another example, when the number of the plurality of sensors is three or more, the size of the window 111 can only expose one or two or three sensors. In this way, when the user needs to use a certain sensor, the support 102 can be driven to move, so that this sensor is exposed through the window 111. To this end, the display apparatus 100 further includes a driver 103, which is connected to the support 102 to drive the support 102 to move.

In some embodiments, as shown in FIG. 2A, the window 111 includes a notch 1111 formed by removing material from the display panel 110. In some embodiments, as shown in FIG. 2B, the window 111 includes a notch 1111 formed by removing material from the display panel 110, and a transparent or semi-transparent protective layer 1112 covering the notch. The transparent or semi-transparent protective layer 1112 may be made of plastic, resin or glass. The transparent or semi-transparent protective layer can protect the aforementioned plurality of the sensors from direct contact with oxygen and moisture, so as to prevent oxygen or moisture from affecting a service life of the plurality of sensors.

It will be noted that the window 111 is not limited to being provided in the display panel 110, but may also be located in the housing 101.

In the display apparatus provided by some embodiments of the present disclosure, the driver 103 controls the support 102 to move in a plane parallel to the display panel 110, so as to drive the plurality of sensors fixed on the support 102 to move in a plane parallel to the display panel 110, and controls the support 102 to stop moving when a sensor required by the user moves to the window. In this way, only one window 111 needs to be provided in the display apparatus, and the plurality of sensors may be sequentially exposed through the window 111 to work normally. In the meantime, the number and the size of the window 111 are reduced, therefore an area occupied by the window in the display apparatus is reduced. In particular, for a full-screen display apparatus, this solution may greatly increase an area of the display area and increase a screen-to-body ratio. The plane parallel to the display panel 110 refers to a plane parallel to a plane where the display area of the display panel 110 is located.

In some embodiments of the present disclosure, as shown in FIG. 2A and FIG. 2B, the housing 101 includes a frame 1011 and a rear shell 1012, and the display panel 110 is located in a space enclosed by the frame 1011 and the rear shell 1012. In this case, the window 111 may also be located in the frame 1011 or in the rear shell 1012.

In some embodiments of the present disclosure, the window 111 may be provided in the rear shell 1012. In this case, the plurality of sensors are provided on a surface of the support 102 proximate to the rear shell 1012, and the support 102 moves so that the plurality of sensors are sequentially exposed through the window 111.

In some embodiments of the present disclosure, the display panel 110 includes a display area and a non-display area located at at least one side of the display area. The window 111 may be disposed in the display area of the display panel 110, or may be disposed in the non-display area of the display panel 110. A depth direction of the window 111 is the same as a thickness direction of the display panel 110.

For a double-sided display panel including two display panels, the display panel 110 includes a first display panel and a second display panel. For example, the first display panel is a color display panel, and the second display panel is an electronic paper display panel. In this case, the rear shell 1012 may be omitted, and the second display panel may be used as the rear shell 1012, with the support 102 being disposed between the first display panel and the second display panel. Moreover, in this case, the window 111 may also be located in the second display panel. A display side of the first display panel is a side of the first display panel away from the second display panel, and a display side of the second display panel is a side of the second display panel away from the first display panel.

Figure 3:
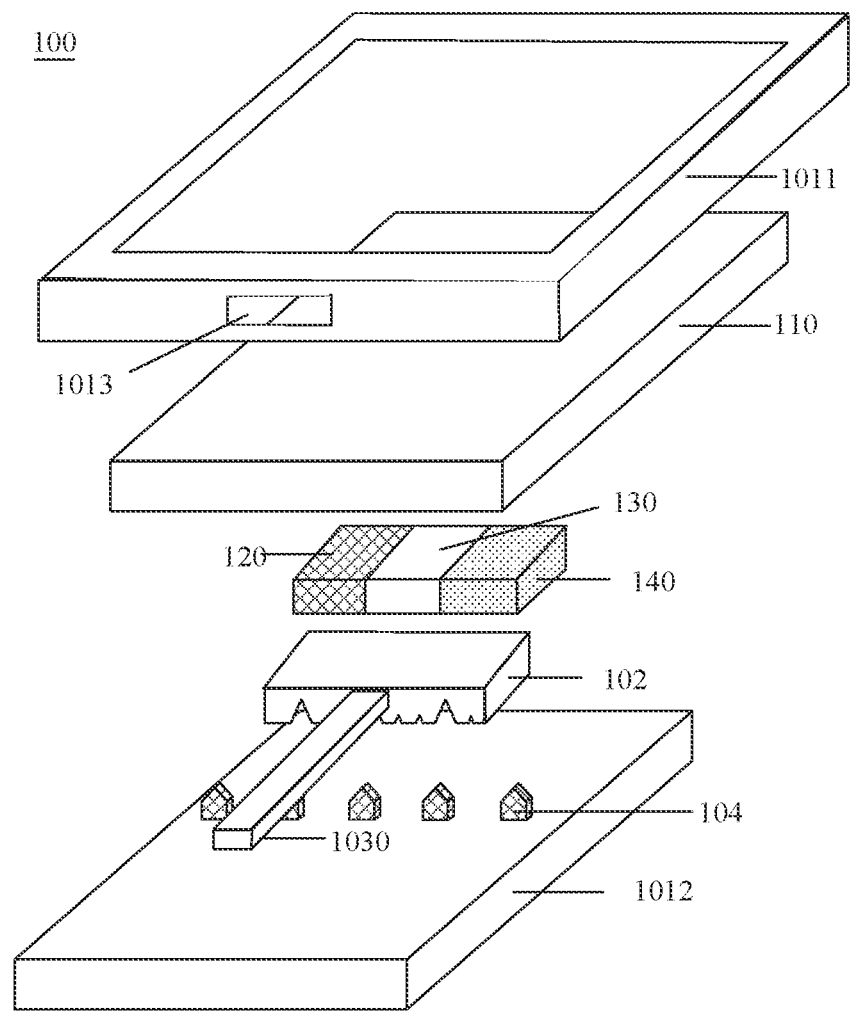
FIG. 3 is an exploded view of a display apparatus, according to some embodiments of the present disclosure.
Figure 4:
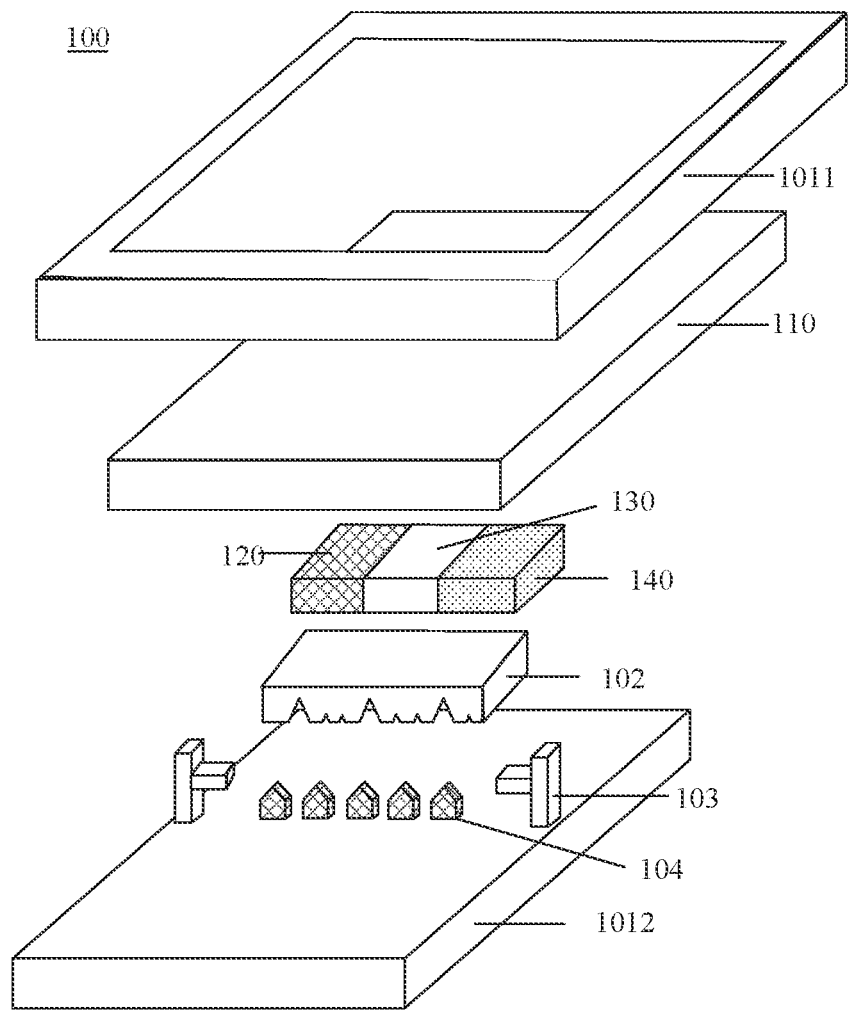
FIG. 4 is an exploded view of another display apparatus, according to some embodiments of the present disclosure.

In some embodiments of the present disclosure, as shown in FIG. 3 and FIG. 4, the support 102 is rectangular, and the plurality of sensors are arranged on the support 102 in a line. The plurality of sensors are fixed on the surface of the support 102 proximate to the display panel 110, and the support 102 moves so that one of the plurality of sensors is exposed through the window 111. In some embodiments of the present disclosure, the window 111 is larger, and the support 102 moves so that two or more of the plurality of sensors are exposed through the window 111. As an example, FIG. 3 and FIG. 4 only show the camera 120, the fingerprint sensor 130 and the optical sign recognition sensor 140.

It will be noted that although not shown in FIG. 3 and FIG. 4, guide rail(s) are provided between the support 102 and the rear shell 1012, and the support 102 cooperates with the guide rail(s) to slide along the guide rail(s). The support 102 can translate along an arbitrary linear direction in a plane parallel to the display panel 110, for example, in a left-right direction shown in FIG. 3.

In some embodiments of the present disclosure, as shown in FIG. 3, the driver 103 includes an adjusting rod 1030. One end of the adjusting rod 1030 is connected to the support 102, and another end can be touched by the user. The frame 1011 includes an opening 1013, and the adjusting rod 1030 protrudes from the opening 1013 so that it can be touched by the user. The user can manually move the adjusting rod 1030 to move the support 102. In some embodiments of the present disclosure, one end of the adjusting rod 1030 may be hinged to the support 102. When the support 102 does not need to be moved, the user can turn the adjusting rod 1030 to retract it toward the display apparatus 100 to avoid affecting an appearance of the display apparatus. For example, the adjusting rod 1030 can be rotated from a front-rear direction shown in FIG. 3 (i.e., a direction perpendicular to a paper surface) to the left-right direction shown in FIG. 3, so as to be retracted toward the display apparatus 100.

Figure 5:
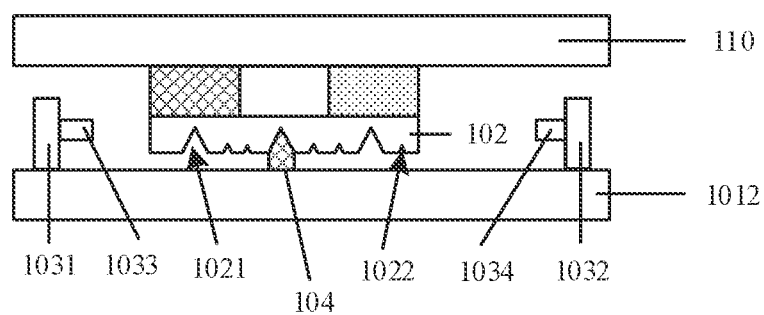
FIG. 5 is a side view of FIG. 4 with a frame in a housing being omitted.

In some embodiments of the present disclosure, a driver 103 for automatically moving the support 102 is provided, so as to make the operation and use of the display apparatus easier. As shown in FIG. 4 and FIG. 5, the driver 103 includes a first electromagnetic switch 1031, a second electromagnetic switch 1032, a first electromagnet 1033 and a second electromagnet 1034. The first electromagnet 1033 and the second electromagnet 1034 are respectively arranged at two opposite sides of the support 102.

Figure 6:
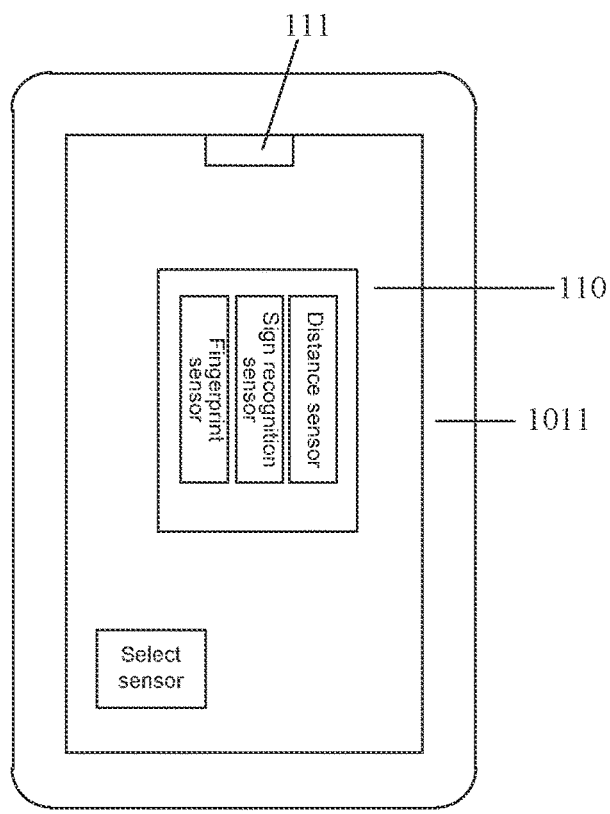
FIG. 6 is a schematic diagram of an operation effect of a display apparatus, according to some embodiments of the present disclosure.

As shown in FIG. 6, when the user needs to use any one of the plurality of sensors, the user can trigger a button for selecting sensor on the display panel 110, for example, click on "Select sensor" on the display panel 110. The display apparatus 100 detects the user's operation, and the display panel 110 displays a selection interface. The selection interface includes options corresponding to the plurality of sensors. For example, the options shown in FIG. 6 include a fingerprint sensor, an optical sign recognition sensor and a distance sensor. After the user selects an option corresponding to the required sensor, the first electromagnetic switch 1031 receives the user's instruction and controls the support 102 to move in a direction from the first electromagnet 1033 to the second electromagnet 1034 or a direction from the second electromagnet 1034 to the first electromagnet 1033 (for example, the left-right direction shown in FIG. 4 and FIG. 5), or, the second electromagnetic switch 1032 receives the user's instruction and controls the support 102 to move in the direction from the first electromagnet 1033 to the second electromagnet 1034 or the direction from the second electromagnet 1034 to the first electromagnet 1033 (for example, the left-right direction shown in FIG. 4 and FIG. 5). For example, when the display apparatus 100 detects an operation that the user clicks on "Fingerprint sensor", it will control the driver 103 to drive the support 102 to move, so that the fingerprint sensor 130 moves to the position of the window 111. If the display apparatus 100 detects an operation that the user clicks on "Optical sign recognition sensor", it will control the driver 103 to drive the support 102 to move, so that the optical sign recognition sensor 140 moves to the position of the window 111. If the display apparatus 100 detects an operation that the user clicks on the "Distance sensor", it will control the driver 103 to drive the support 102 to move, so that the distance sensor 150 moves to the position of the window 111.

Figure 7:
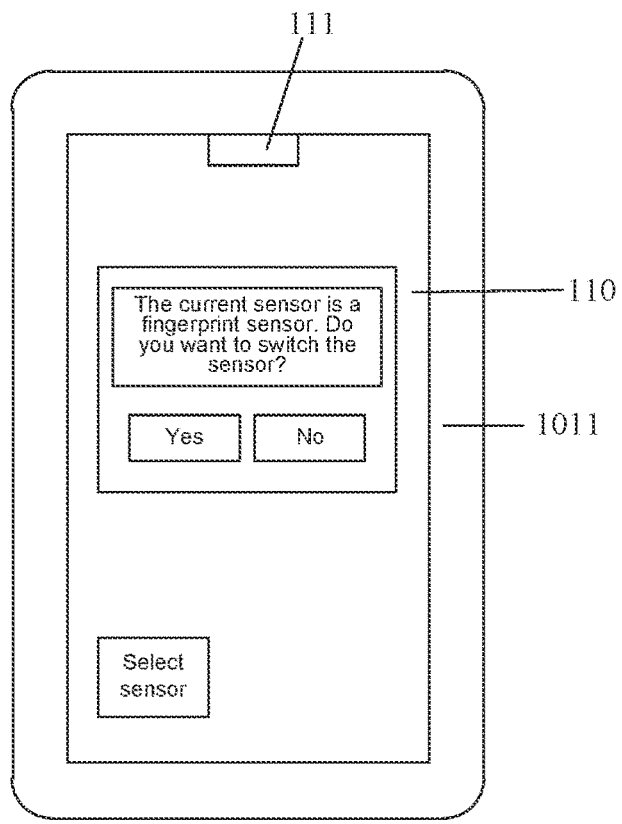
FIG. 7 is a schematic diagram of yet another operation effect of a display apparatus, according to some embodiments of the present disclosure.

Or, in some embodiments, as shown in FIG. 7, the display apparatus 100 detects an operation that the user clicks on "Select sensor" on the display panel 110, and the display panel 110 displays a prompt message "The current sensor is a fingerprint sensor. Do you want to switch the sensor?". If the display apparatus detects an operation that the user clicks on "Yes", the display panel 110 will displays a selection interface that includes options corresponding to the plurality of sensors. The user selects an option, and then the sensor will be switched. If the display apparatus detects operation that the user clicks on "No", the sensor will not be switched.

The support 102 may be made of a magnetic material. For example, the support 102 is made of iron, cobalt, nickel or other magnetic metals. When the first electromagnetic switch 1031 is turned on, the first electromagnet 1033 generates magnetism through electromagnetic induction, and attracts the support 102 to move toward the first electromagnet 1033. When the second electromagnetic switch 1032 is turned on, the second electromagnet 1034 generates magnetism through electromagnetic induction, and attracts the support 102 to move toward the second electromagnet 1034.

Or, the support 102 may be made of a permanent magnet. In a moving direction of the support 102, an end of the support 102 proximate to the first electromagnet 1033 is an N pole, and an end of the support 102 proximate to the second electromagnet 1034 is an S pole. Or conversely, the end of the support 102 proximate to the first electromagnet 1033 is an S pole, and the end of the support 102 proximate to the second electromagnet 1034 is an N pole. When the first electromagnetic switch 1031 is turned on, the first electromagnet 1033 generates magnetism through electromagnetic induction, and attracts the support 102 to move closer to the first electromagnet 1033, or repels the support 102 to move away from the first electromagnet 1033. This is related to an electromagnetic field generated by the first electromagnet 1033 and whether the end of the support 102 proximate to the first electromagnet 1033 is an N pole or an S pole. When the second electromagnetic switch 1032 is turned on, the second electromagnet 1034 induces magnetism, and attracts the support 102 to move closer to the second electromagnet 1034, or repels the support 102 to move away from the second electromagnet 1034. This is related to an electromagnetic field generated by the second electromagnet 1034 and whether the end of the support 102 proximate to the second electromagnet 1034 is an N pole or an S pole.

In use, in a case where the support 102 is made of a magnetic material, the first electromagnetic switch 1031 and the second electromagnetic switch 1032 must be prevented from being simultaneously turned on. This is because in this case, magnetic forces exerted by the first electromagnet 1033 and the second electromagnet 1034 on the support 102 are reversed, and if the first electromagnetic switch 1031 and the second electromagnetic switch 1032 are simultaneously turned on, it is easy to cause a misoperation that the support 102 moves in a wrong direction.

In a case where the support 102 is made of a permanent magnet, the first electromagnetic switch 1031 and the second electromagnetic switch 1032 can be simultaneously turned on. This is because in this case, the magnetic forces exerted by the first electromagnet 1033 and the second electromagnet 1034 on the support 102 are in the same direction (one is attraction and the other is repulsion), and turning on the two simultaneously will not cause the misoperation that the support 102 moves in the wrong direction.

In addition, in a case where the support 102 is more proximate to the first electromagnet 1033 than to the second electromagnet 1034, when the first electromagnet 1033 exerts a repulsive force on the support 102 and the second electromagnet 1034 exerts an attractive force on the support 102, as the support 102 moves toward the second electromagnet 1034, the repulsive force between the first electromagnet 1033 and the support 102 gradually decreases, and the attractive force between the second electromagnet 1034 and the support 102 gradually increases. Therefore, when the first electromagnetic switch 1031 and the second electromagnetic switch 1032 are simultaneously turned on, a resultant force borne by the support 102 as a whole substantially does not change much, thereby ensuring a smooth movement of the support 102. In a case where the support 102 is more proximate to the second electromagnet 1034 than to the first electromagnet 1033, a flow direction of a current in a loop where the first electromagnet 1033 and the second electromagnet 1034 are located can be changed, so that the first electromagnet 1033 exerts an attractive force on the support 102 and the second electromagnet 1034 exerts a repulsive force on the support 102, so that the support 102 moves toward the first electromagnet 1033.

If before the first electromagnetic switch 1031 and the second electromagnetic switch 1032 receive the user's instruction, the sensor facing the window 111 is already the sensor corresponding to the user's instruction, then after the first electromagnetic switch 1031 and the second electromagnetic switch 1032 receive the user's instruction, there is no need to control the support 102 to move.

In some embodiments of the present disclosure, as shown in FIG. 3 and FIG. 4, the display apparatus further includes a limiting structure 104, which is arranged between the support 102 and the rear shell 1012 of the housing 101. The limiting structure 104 is configured to make the support 102 stop moving when one of the plurality of sensors moves to the position of the window 111. The limiting structure 104 includes at least one protrusion. One end of the protrusion is fixed on a surface of the rear shell 1012 proximate to the display panel 110, and another end of the protrusion abuts against the support 102. Due to a friction force of the protrusion(s) on the support 102, when the sensor required by the user moves to the position of the window 111, the support 102 stops moving. A shape of the limiting structure 104 is not limited, as long as it can make the support 102 stop moving. For example, in FIG. 3 and FIG. 4, a shape of a top end of the limiting structure 104 proximate to the support 102 in a plane parallel to the paper is a triangle, but it is not limited thereto, and may also be a rectangle, a trapezoid, etc.

Figure 8:
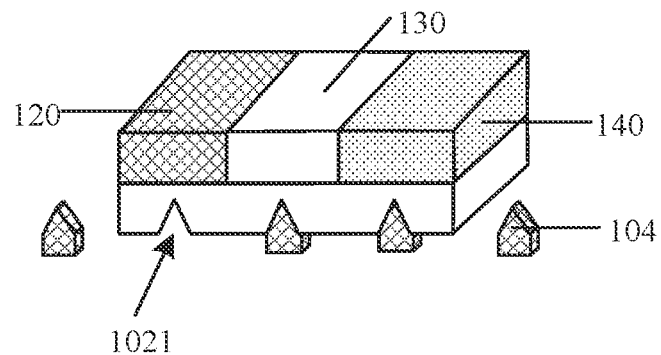
FIG. 8 is a diagram showing a relationship between a limiting structure and a support, according to some embodiments of the present disclosure.
Figure 9:
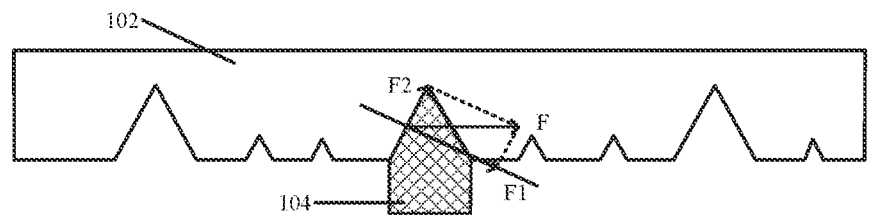
FIG. 9 is a force analysis diagram when the support moves.

In some embodiments of the present disclosure, as shown in FIG. 5 and FIG. 8, the support 102 includes at least one limiting groove 1021. The at least one limiting groove 1021 is located in the surface of the support 102 away from the display panel 110, and the at least one limiting groove 1021 cooperates with the limiting structure 104 to make the support 102 stop moving. In some embodiments of the present disclosure, as shown in FIG. 5, an end of the limiting structure 104 that abuts against the support 102 can be embedded in the limiting groove 1021 to stop the support 102 from moving. As shown in FIG. 9, in an example where the support 102 moves to the right and stops moving, the display apparatus 100 controls the driver 103 to apply a horizontal rightward force F to the support 102, and then the support 102 applies the same horizontal rightward force F to the limiting structure 104. On a force receiving surface of the limiting structure 104, the force F is decomposed into a force F1 and a force F2 along two mutually perpendicular directions. The force F1 is perpendicular to the force receiving surface of the limiting structure 104, and cannot cause the support 102 to escape from the limiting structure 104; but the force F2 is parallel to the force receiving surface of the limiting structure 104, and can cause the support 102 to escape from the limiting structure 104 and move to the right. When the required sensor moves to the position of the window 111, the force provided by the driver 103 on the support 102 is removed, and the limiting structure 104 matches with the corresponding limiting groove 1021, so that the support 102 stops moving without the action of the force F.

In some embodiments of the present disclosure, there is a magnetic attraction between the limiting groove 1021 and the limiting structure 104, and the top end of the limiting structure 104 proximate to the support 102 can be attracted in the limiting groove 1021 to make the support 102 stop moving. In some embodiments of the present disclosure, the force receiving surface of the limiting structure 104 has a certain roughness, so that a surface friction applied to the limiting groove 1021 is sufficient to stop the moving support 102 from moving.

In some embodiments of the present disclosure, as shown in FIG. 5, the support 102 further includes at least one buffer groove 1022 in the surface thereof away from the display panel 110. The at least one buffer groove 1022 is configured to interact with the limiting structure 104 to buffer the movement of the support 102, so as to avoid a situation that when the support 102 needs to be stopped, the support cannot be fixed by the limiting groove(s) 1021 alone because the support 102 moves too fast. A depth of the buffer groove 1022 is less than a depth of the limiting groove 1021. Or, there is a magnetic attraction between the limiting groove 1021 and the limiting structure 104, and between the buffer groove 1022 and the limiting structure 104, and an attractive force of the limiting groove 1021 direct facing the limiting structure 104 on the limiting structure is greater than an attractive force of the buffer groove 1022 direct facing the limiting structure 104 on the limiting structure. Or, a surface friction of the limiting groove 1021 is greater than the surface friction of the buffer groove 1022, therefore a limiting effect of the buffer groove 1022 on the support 102 is less than a limiting effect of the limiting groove 1021 on the support 102.

For this purpose, in some embodiments of the present disclosure, the depth of the buffer groove 1022 can be made smaller than the depth of the limiting groove 1021 and the attractive force of the limiting groove 1021 direct facing the limiting structure 104 on the limiting structure is greater than the attractive force of the buffer groove 1022 direct facing the limiting structure 104 on the limiting structure. Or, the depth of the buffer groove 1022 is less than the depth of the limiting groove 1021, and the surface friction of the limiting groove 1021 is greater than the surface friction of the buffer groove 1022. Or, the depth of the buffer groove 1022 is less than the depth of the limiting groove 1021 the attractive force of the limiting groove 1021 direct facing the limiting structure 104 on the limiting structure is greater than the attractive force of the buffer groove 1022 direct facing the limiting structure 104 on the limiting structure, and the surface friction of the limiting groove 1021 is greater than the surface friction of the buffer groove 1022.

In some embodiments of the present disclosure, a height of the limiting structure 104 is adjustable along a depth direction of the limiting groove 1021 (i.e., the vertical direction shown in FIG. 5). If the limiting structure 104 is used to make the support 102 stop moving, along the depth direction of the limiting groove 1021, the limiting structure 104 extends until it extends into the limiting groove 1021 to fix the support 102. Otherwise, the surface of the limiting structure 104 proximate to the support 102 is retracted to be flush with a top surface of the limiting groove 1021 (i.e., a lower surface of the support 102 shown in FIG. 5) to prevent the limiting structure 104 from affecting the movement of the support 102 during a moving process of the support 102.

Figure 10:
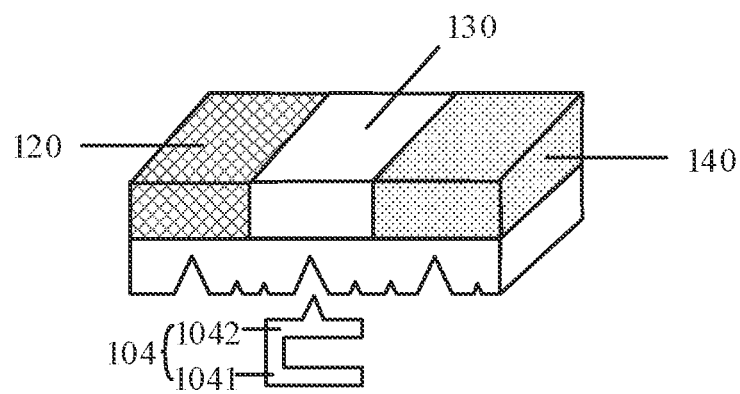
FIG. 10 is a diagram showing a relationship between another limiting structure and a support, according to some embodiments of the present disclosure.

For example, as shown in FIG. 10, the limiting structure includes a fixed portion 1041 provided on the rear shell 1012 and a telescopic portion 1042 that is sleeved in the fixed portion 1041 and can slide in the fixed portion. The first electromagnetic switch 1031 is closed after receiving the user's instruction, and controls the support 102 to move. Under an action of the force exerted by the support 102, the telescopic portion 1042 moves toward the fixed portion 1041 and deforms, so as to retract to be flush with the top surface of the limiting groove 1021. When the required sensor moves to the position of the window, the limiting structure 104 exactly corresponds to the position of the corresponding limiting groove. At this time, the force exerted by the support 102 on the limiting structure 104 disappears, and the telescopic portion 1042 recovers from deformation and extends into the limiting groove 1021, and cooperates with the limiting groove to make the support 102 stop moving.

Figure 11:
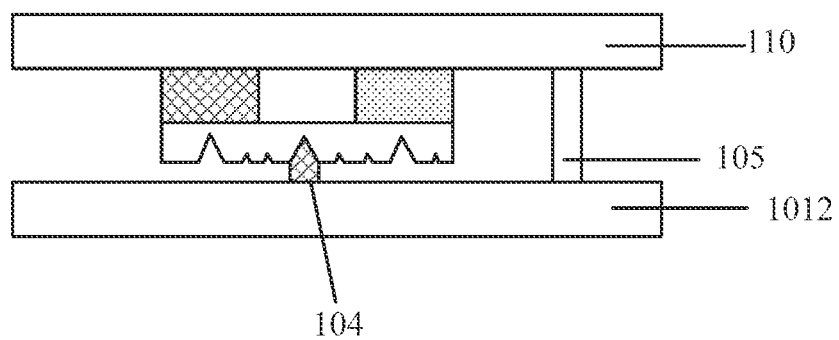
FIG. 11 is a side view of a display apparatus, according to some embodiments of the present disclosure.

In some embodiments of the present disclosure, as shown in FIG. 11, the display apparatus further includes a supporting structure 105 for supporting the display panel 110 and the housing 101. For example, the supporting structure 105 is supported between the display panel 110 and the rear shell 1012, so as to reserve a space for placing the limiting structure 104 and the sensors. In a case where the display panel 110 includes a first display panel and a second display panel, and the second display panel is used to replace the rear shell 1012 in the housing 101, the supporting structure 105 is supported between the first display panel and the second display panel.

Figure 12:
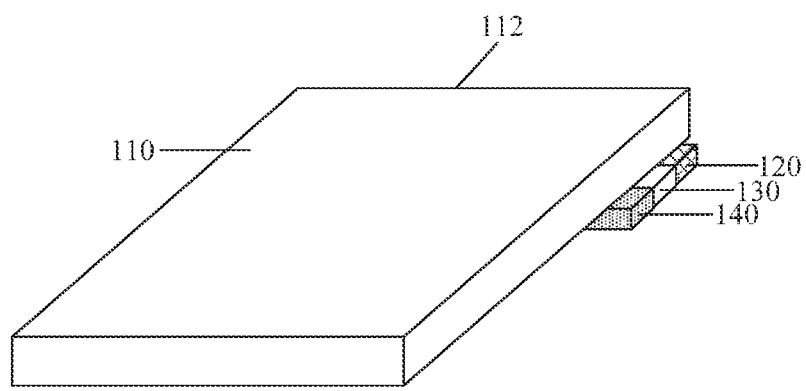
FIG. 12 is a structural diagram showing a relationship between a display panel and a support in a display apparatus, according to some embodiments of the present disclosure.

As shown in FIG. 12, in a case where a camera 120 is provided on the support 102, at least two sensors are arranged along a direction from an upper edge of the display apparatus to a lower edge of the display apparatus. The camera 120 is arranged more proximate to the upper edge 112 relative to other sensors, and the camera 120 can protrude from the upper edge of the display apparatus.

In some embodiments of the present disclosure, a portion of the frame 1011 directly opposite to the camera 120 is movably connected to other portions of the frame. When the camera 120 protrudes from the display apparatus, the portion of the frame that is directly opposite to the camera 120 is opened to form a gap; otherwise, the portion of the frame that is directly opposite to the camera 120 is connected to other portions of the frame.

In some embodiments of the present disclosure, when the camera 120 protrudes, another sensor may be moved to the window 111, so that two functions (the function of the camera and the function of the other sensor) can be simultaneously realized.

The foregoing descriptions are merely specific implementations of the present disclosure, but the protection scope of the present disclosure is not limited thereto. Any person skilled in the art could conceive of changes or replacements within the technical scope disclosed by the present disclosure, which shall all be included in the protection scope of the present disclosure. Therefore, the protection scope of the present disclosure shall be subject to the protection scope of the claims.

What is claimed is:

1. A display apparatus, comprising:
   a display panel;
   a housing configured to support and protect the display panel;
   a support, the support being arranged between the display panel and the housing;
   a plurality of sensors, the plurality of sensors being fixed on the support;

a window, the window being located in the display panel or the housing and being configured to expose at least one sensor; and a driver, the driver being configured to control the support to move along a plane parallel to the display panel, and to control the support to stop moving when a required sensor moves to a position of the window.

2. The display apparatus according to claim 1, wherein the driver includes a first electromagnetic switch, a second electromagnetic switch, a first electromagnet and a second electromagnet;

the first electromagnet and the second electromagnet are respectively arranged at two opposite sides of the support;

the first electromagnetic switch is configured to control the support to move in a direction from the first electromagnet to the second electromagnet or a direction from the second electromagnet to the first electromagnet in response to an instruction; and the second electromagnetic switch is configured to control the support to move in the direction from the first electromagnet to the second electromagnet or the direction from the second electromagnet to the first electromagnet in response to an instruction.

3. The display apparatus according to claim 2, wherein the support is made of a magnetic material or a permanent magnet.

4. The display apparatus according to claim 3, the support is made of a permanent magnet, and the first electromagnetic switch and the second electromagnetic switch are configured to be simultaneously turned on or not to be simultaneously turned on.

5. The display apparatus according to claim 3, wherein the support is made of a magnetic material, and the first electromagnetic switch and the second electromagnetic switch are configured not to be simultaneously turned on.

6. The display apparatus according to claim 1, wherein the driver includes an adjusting rod, and the housing includes an opening;

one end of the adjusting rod is connected to the support, and another end of the adjusting rod protrudes from the housing through the opening.

7. The display apparatus according to claim 1, further comprising limiting structure, and the limiting structure being disposed between the housing and the support;

wherein the limiting structure is configured to make the support stop moving when the required sensor moves to the position of the window.

8. The display apparatus according to claim 7, wherein the limiting structure includes at least one protrusion arranged on the housing.

9. The display apparatus according to claim 7, wherein the support includes at least one limiting groove, and the at least one limiting groove is configured to cooperate with the limiting structure to make the support stop moving when the required sensor moves to the position of the window.

10. The display apparatus of claim 9, wherein a height of the limiting structure is adjustable along a depth direction of the at least one limiting groove;

when the support moves, an end of the limiting structure proximate to the support is retracted to be flush with a top surface of the at least one limiting groove, and when the support stops moving, the end of the limiting structure proximate to the support extends into the at least one limiting groove.

11. The display apparatus according to claim 9, wherein the support further includes at least one buffer groove; the at least one buffer groove and the at least one limiting groove meet at least one of the following conditions, a depth of the at least one buffer groove is less than a depth of the at least one limiting groove; an attractive force of the at least one buffer groove direct facing the limiting structure on the limiting structure is less than an attractive force of the at least one limiting groove direct facing the limiting structure on the limiting structure; or a surface friction force of the at least one buffer groove is less than a surface friction force of the at least one limiting groove.

12. The display apparatus according to claim 1, wherein the display panel includes a first display panel and a second display panel;

a surface of the first display panel facing away from the second display panel is a display surface, a surface of the second display panel facing away from the first display panel is a display surface, and the window is arranged in the first display panel or in the second display panel;

the housing includes a frame, and the frame supports and protects the first display panel and the second display panel.

13. The display apparatus according to claim 12, further comprising a supporting structure, and the supporting structure is supported between the first display panel and the second display panel.

14. The display apparatus of claim 1, wherein the housing includes a frame and a rear shell; the rear shell is disposed opposite to the display panel, and the window is disposed in the rear shell.

15. The display apparatus according to claim 14, further comprising a support structure, and the support structure is supported between the display panel and the rear shell.

16. The display apparatus according to claim 1, wherein the display panel includes a display area and a non-display area located at at least one side of the display area, and the window is disposed in the display area, or the window is disposed in the non-display area.

17. The display apparatus according to claim 1, wherein the window includes a notch formed by removing material from the display panel; or, the window includes a notch formed by removing material from the display panel, and a transparent or semi-transparent protective layer covering the notch.

18. The display apparatus according to claim 1, wherein the plurality of sensors include at least two of a camera, a fingerprint sensor, an optical sign recognition sensor, a distance sensor, a proximity light-sensor or an ambient light sensor.

* * * * *